(12) United States Patent
Miyazaki (10) Patent No.: US 11,797,806 B2
(45) Date of Patent: Oct. 24, 2023

(54) IMAGE PROCESSING APPARATUS, IMAGE PROCESSING METHOD, NON-TRANSITORY COMPUTER-READABLE STORAGE MEDIUM STORING PROGRAM

(71) Applicant: CANON KABUSHIKI KAISHA, Tokyo (JP)

(72) Inventor: Shinichi Miyazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/161,869

(22) Filed: Jan. 29, 2021

(65) Prior Publication Data

US 2021/0241056 A1    Aug. 5, 2021

(30) Foreign Application Priority Data

Jan. 31, 2020  (JP) ................. 2020-015536

(51) Int. Cl.
*H04N 1/60*     (2006.01)
*G06K 15/02*    (2006.01)
(Continued)

(52) U.S. Cl.
CPC ..... *G06K 15/1872* (2013.01); *G06K 15/1886* (2013.01); *G06T 5/009* (2013.01); (Continued)

(58) Field of Classification Search
CPC ............ G06K 15/1872; G06K 15/1886; G06T 5/009; G06T 7/11; G06T 2207/20208; G09G 2320/066
See application file for complete search history.

(56) References Cited

U.S. PATENT DOCUMENTS 7,783,121 B1 *  8/2010  Cox ................ G06V 10/50
                                                     382/254
8,259,373 B2   9/2012  Jung
(Continued)

FOREIGN PATENT DOCUMENTS

CN    109983754 A    7/2019
CN    110661931 A    1/2020
(Continued)

OTHER PUBLICATIONS

Office Action dated Nov. 10, 2021, in U.S. Appl. No. 17/161,862.
(Continued)

*Primary Examiner* — Ted W Barnes
(74) *Attorney, Agent, or Firm* — Venable LLP (57) ABSTRACT

An image processing apparatus with a processor and a memory storing instructions, that, when executed, cause the processor to obtain HDR data representing a high-dynamic range (HDR) image, in an image transfer function of the HDR data, a tone of each pixel is defined based on a relative luminance value, to obtain print information to perform printing based on the obtained HDR data, to set luminance information to be a target absolute luminance value, and to perform a luminance conversion on the HDR data so that a tone of each pixel is defined based on an absolute luminance value and the target absolute luminance value being a maximum luminance, to convert a dynamic range of luminance of the HDR data, on which the luminance conversion has been performed, into a dynamic range corresponding to printing of an image on a print medium performed based on the print information.

24 Claims, 9 Drawing Sheets

(51) Int. Cl.
*G06T 7/11* (2017.01)
*G06T 5/00* (2006.01)
*G09G 5/10* (2006.01)

(52) U.S. Cl.
CPC ............... *G06T 7/11* (2017.01); *G09G 5/10* (2013.01); *H04N 1/6005* (2013.01); *G06T 2207/20208* (2013.01); *G09G 2320/066* (2013.01)

(56) References Cited

U.S. PATENT DOCUMENTS

| | | | |
|---|---|---|---|
| 9,883,112 B1* | 1/2018 | Igor' Valer'Evich | H04N 25/13 |
| 10,848,644 B2* | 11/2020 | Suwa | H04N 1/6097 |
| 11,146,738 B2* | 10/2021 | Kagawa | G06T 7/11 |
| 11,182,883 B2 | 11/2021 | Kagawa et al. | |
| 2004/0205640 A1 | 10/2004 | Laughlin | |
| 2004/0264799 A1* | 12/2004 | Gallagher | G06T 3/4092 382/302 |
| 2005/0254722 A1* | 11/2005 | Fattal | G06T 5/40 382/162 |
| 2007/0009167 A1* | 1/2007 | Dance | G06T 5/40 382/254 |
| 2008/0131016 A1* | 6/2008 | Kokemohr | G06T 5/009 382/254 |
| 2008/0310501 A1* | 12/2008 | Ward | H04N 19/463 375/E7.184 |
| 2009/0041376 A1* | 2/2009 | Carletta | G06T 5/50 382/274 |
| 2010/0053376 A1* | 3/2010 | Fukuda | G06T 5/009 348/E9.053 |
| 2011/0273731 A1 | 11/2011 | Haikin et al. | |
| 2012/0236020 A1* | 9/2012 | Paris | G06T 5/009 345/589 |
| 2014/0140615 A1* | 5/2014 | Finlayson | G06T 5/009 382/167 |
| 2015/0170389 A1* | 6/2015 | Ming | G06T 5/009 382/284 |
| 2017/0330312 A1* | 11/2017 | Nam | H04N 5/202 |
| 2018/0270489 A1* | 9/2018 | Maymon | H04N 19/182 |
| 2019/0246087 A1* | 8/2019 | Uesaka | G06T 5/007 |
| 2019/0303733 A1* | 10/2019 | Kozuka | H04N 1/6097 |
| 2019/0364171 A1* | 11/2019 | Suwa | H04N 1/4074 |
| 2020/0007695 A1* | 1/2020 | Kagawa | H04N 1/6058 |
| 2020/0007712 A1* | 1/2020 | Ogawa | H04N 1/4074 |
| 2020/0007717 A1* | 1/2020 | Suwa | H04N 1/6086 |
| 2020/0007734 A1* | 1/2020 | Kagawa | G06T 5/009 |
| 2020/0013149 A1* | 1/2020 | Yazawa | H04N 1/6027 |
| 2020/0013150 A1* | 1/2020 | Kagawa | G06T 5/10 |
| 2020/0068161 A1* | 2/2020 | Zhang | H04N 5/20 |
| 2020/0090313 A1* | 3/2020 | Bugdary | G06N 3/045 |
| 2020/0272374 A1* | 8/2020 | Kawai | H04N 1/6052 |
| 2020/0288051 A1* | 9/2020 | Suwa | G06T 5/007 |
| 2020/0302659 A1* | 9/2020 | Urabe | G06T 5/009 |
| 2021/0217151 A1* | 7/2021 | Yadid-Pecht | G06N 3/08 |
| 2021/0241056 A1* | 8/2021 | Miyazaki | G06T 7/11 |

FOREIGN PATENT DOCUMENTS

| | | | | |
|---|---|---|---|---|
| CN | 113276570 A | * | 8/2021 | ............ B41J 3/445 |
| EP | 1742178 A2 | * | 1/2007 | ............ G06T 5/008 |
| EP | 3544280 A1 | * | 9/2019 | ......... G06K 15/1878 |
| EP | 3544280 A1 | | 9/2019 | |
| EP | 3588930 A1 | * | 1/2020 | ............ G06T 5/009 |
| EP | 3588930 A1 | | 1/2020 | |
| JP | 2002016816 A | | 1/2002 | |
| JP | 2011097366 A | | 5/2011 | |
| JP | 2019080156 A | | 5/2019 | |
| JP | 2020004268 A | | 1/2020 | |
| WO | 2018092711 A1 | | 5/2018 | |
| WO | WO-2018092711 A | * | 5/2018 | ......... G06K 15/1878 |

OTHER PUBLICATIONS

Kudo et al., "Color restoration of lighting scenes with locally adapted HDR images," IEEE, 2015.
European Search Report dated Jun. 16, 2021, issued in corresponding European Application No. 21154212.1.
Extended European Search Report dated Jun. 30, 2021, issued in European Patent Application No. 21154213.9.
Chinese Office Action dated Jul. 1, 2022, issued in corresponding Chinese Patent Application No. 2021-10123781.3.
Japanese Office Action dated Sep. 8, 2023, in corresponding Japanese Patent Application No. 2020-015536, with English translation (12 pages).

* cited by examiner

IMAGE PROCESSING APPARATUS, IMAGE PROCESSING METHOD, NON-TRANSITORY COMPUTER-READABLE STORAGE MEDIUM STORING PROGRAM

CROSS-REFERENCE TO RELATED APPLICATION

This application claims the benefit of Japanese Patent Application No. 2020-015536, filed Jan. 31, 2020, which is hereby incorporated by reference herein in its entirety.

BACKGROUND OF THE INVENTION

Field of the Invention

The present invention relates to an image processing apparatus that can process high dynamic range data, an image processing method, and a non-transitory computer-readable storage medium storing a program.

Description of the Related Art

International Publication No. 2018/092711 discloses that the luminance dynamic range of the HDR data of a high dynamic range (HDR) still image is converted into still image data that has a narrower dynamic range that is determined by the reflection luminance of a print sheet. HDR data is used as image capturing data of a moving image, a still image, and the like. Recently, the maximum luminance that can be displayed in a display that displays HDR data has improved, and the HDR data from the highlight side to the shadow side of an image can be displayed simultaneously with high image quality.

For example, in Recommendation ITU-R (International Telecommunication Union Radiocommunication Sector) BT.2100-2 (July 2018) Image parameter values for high dynamic range television for use in production and international programme exchange, Hybrid Log Gamma (HLG) and Perceptual Quantization (PQ) are defined as two image transfer functions of HDR data. In a transfer function, the transfer function and a bit count are defined so the tonal discontinuity will not be visually detected in image transfer.

An imaging method is defined by an OETF (Opto-Electronic Transfer Function) of the image capturing side, an EOTF (Electro-Optical Transfer Function) of the display side, and an OOTF (Opto-Optical Transfer Function) that represents the overall characteristic of conversion from scene light to display light.

An HLG method is a method that defines the OETF of the image capturing side described above by handling the range of black to white as relative tones. The EOTF of the display side is formed by an inverse function of the OETF and the OOTF which represents the overall characteristic of conversion from scene light to display light. In the HLG method, system gamma that determines the characteristic of the OOTF is applied only on a luminance component. In addition, the system gamma is determined in accordance with the luminance of each display by considering how image quality changes between displays with different maximum displayable luminance values. Also, the PQ method is a method that defines the EOTF of the display side described above by representing the display-side luminance by an absolute value of maximum 10,000 cd/m². The OETF of the image capturing side is formed by the OOTF and an inverse function of the EOTF.

On the other hand, the dynamic range of a print output tends to be narrower than the dynamic range of HDR data. In recent years, SDR (Standard Dynamic Range) displays were mainstream until the appearance of HDR displays with wide display luminance ranges. Conventionally, the maximum luminance value used when SDR data is to be displayed on a display is normally considered to be fixed at 100 cd/m². In contrast, the maximum value of luminance used when HDR data is to be displayed on a display can be changed in accordance with the luminance value defined by the HDR data or the maximum luminance value of the HDR display.

SUMMARY OF THE INVENTION

The present invention provides an image processing apparatus that prevents image quality degradation when a print output is to be performed based on HDR data representing a high dynamic range (HDR) image, an image processing method, and a non-transitory computer-readable storage medium storing a program.

The present invention in its first aspect provides an image processing apparatus comprising a first obtainment unit configured to obtain HDR data that represents a high-dynamic range (HDR) image, a second obtainment unit configured to obtain print information to perform printing based on the HDR data obtained by the first obtainment unit, a setting unit configured to set luminance information to be a target of the HDR data obtained by the first obtainment unit, and a conversion unit configured to convert a dynamic range of luminance of the HDR data, which has been obtained by the first obtainment unit and has been set by the setting unit with the luminance information to be the target, into a dynamic range by which printing is to be performed based on the print information obtained by the second obtainment unit.

The present invention in its second aspect provides an image processing method to be executed in an image processing apparatus, the method comprising obtaining HDR data which represents a high-dynamic range (HDR) image, obtaining print information to perform printing based on the obtained HDR data, setting luminance information to be a target of the obtained HDR data, and converting a dynamic range of luminance of the obtained HDR data, which has been set with the luminance information to be the target, into a dynamic range by which printing is to be performed based on the obtained print information.

The present invention in its third aspect provides a non-transitory computer-readable storage medium storing a program to cause a computer to function to obtain HDR data that represents a high-dynamic range (HDR) image to obtain print information to perform printing based on the obtained HDR data to set luminance information to be a target of the obtained HDR data, and to convert, a dynamic range of luminance of the obtained HDR data, which has been set with the luminance information to be the target, into a dynamic range by which printing is to be performed based on the obtained print information.

According to the present invention, image quality degradation can be prevented when a print output is to be performed based on HDR data representing a high dynamic range (HDR) image.

Further features of the present invention will become apparent from the following description of exemplary embodiments with reference to the attached drawings.

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

In a case in which the above-described HDR data is of the HLG method, the HDR data will be data whose tone is defined based on a relative luminance value. Hence, when this HDR data is to be displayed on an HDR display, the HDR data will be displayed in a wide luminance dynamic range that can be reproduced by the HDR display, and an output that has a high image quality and a high contrast can be obtained. On the other hand, the luminance dynamic range that can be reproduced by a print output is narrow. When HDR data whose tone is defined by a relative luminance value is to be printed in a printing apparatus, the luminance dynamic range held by the HDR data undergoes linear conversion relative to the luminance dynamic range of the printing apparatus. As a result, the printed image will have a low contrast and become different from an image that a user actually wants to obtain from printing.

According to one point of view of the present invention, image quality degradation can be prevented when a print output is to be performed based on HDR data representing a high dynamic range (HDR) image.

First Embodiment

[System Arrangement]

Figure 1:
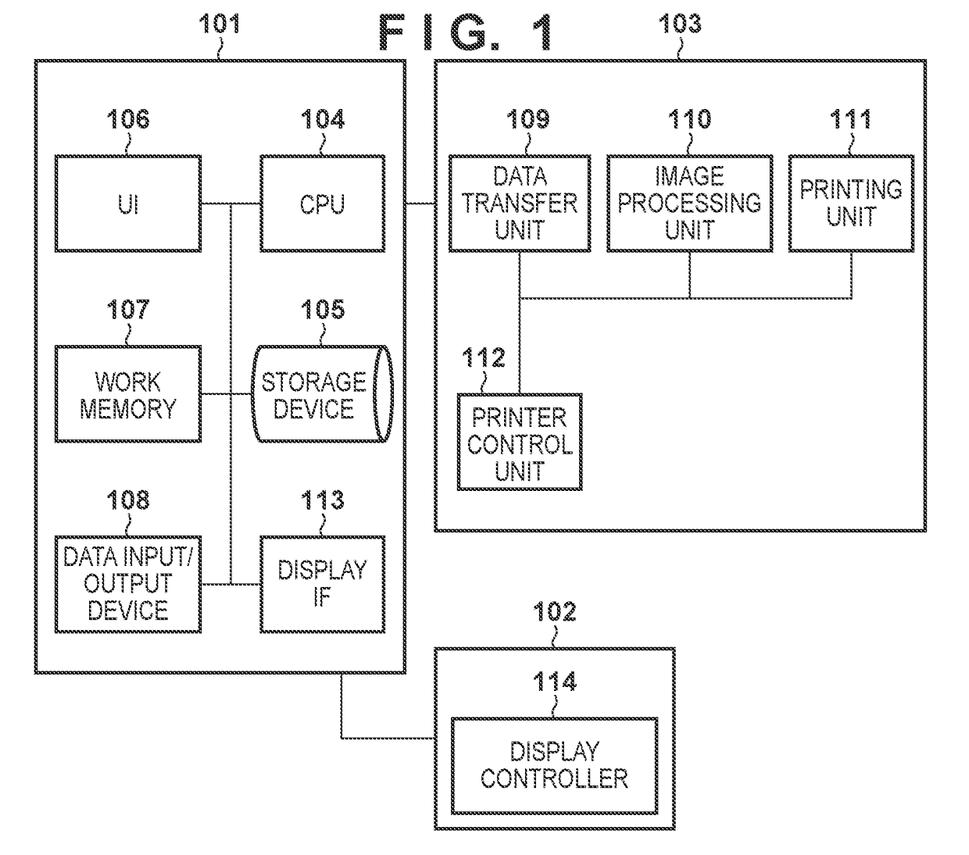
FIG. 1 is a block diagram showing the overall arrangement of a print system.

FIG. 1 is a block diagram showing the overall arrangement of a print system in which an image processing apparatus has been applied according to this embodiment. This print system includes personal computer apparatus (information processing apparatus) 101 (to be also referred to as a "PC" hereafter), a display apparatus 102, and an output apparatus 103.

The display apparatus 102 is connected to the PC 101 via a display I/F. The display apparatus 102 is an HDR (High Dynamic Range) display and is connected to the PC 101 by an HDMI interface. The connection between the PC 101 and the display apparatus 102 is not limited to the HDMI interface and may be of another connection method as long as it is in compliance with a standard that can transfer HDR (High Dynamic Range) data. Also, the display information (to be described later) transferred between the PC 101 and the display apparatus 102 may be transferred via a display I/F 113 by using a USB (Universal Serial Bus) of a transfer path different from the HDMI interface. However, the display information transfer method is not limited to the USB cable as long as information can be communicated bidirectionally between the display apparatus 102 and the PC 101 or the output apparatus 103.

In addition, the output apparatus 103 is connected to the PC 101 via an interface such as a network, a USB cable, or a local bus. In this embodiment, an arrangement that uses an inkjet printer (image processing apparatus) will be described as an example of the output apparatus 103. The PC 101 performs operations such as issuing a print control instruction to the output apparatus 103, transferring necessary information and data, and the like. A storage device 105 stores and manages an OS, a system program, various kinds of application software, parameter data necessary for this embodiment, and the like. The storage device 105 is formed by, for example, a hard disk or a flash ROM. A CPU 104 uses a work memory 107 to read out software or a program stored in the storage device 105 and to execute processing. An operation unit 106 (to be also referred to as a "UI" hereafter) serving as a user interface accepts input related to the execution of processing from a user and performs display to the user. The operation unit 106 includes input devices such as a keyboard, a mouse, and the like. Also, the data input/output device 108 inputs/outputs data to/from an external storage medium such as an SD card, or the like, and can input/output data to/from, for example, an external storage medium storing the data of an image capturing apparatus. In addition, input/output of data to/from an image capturing apparatus may be performed without intervention of an external storage medium by directly connecting the image capturing apparatus (not shown) to the data input/output device 108 or a data transfer unit 109.

The output apparatus 103 includes the data transfer unit 109, a printer control unit 112, an image processing unit 110, a printing unit 111, and receives print data from the PC 101. In this embodiment, the print data includes HDR data as input image data, target information, an image processing parameter and printer control data that are unique data of the storage medium, and printing information such as the printing quality, the print medium, and the like, selected by the user on the operation unit 106. In this case, a print medium is, for example, paper media such as a print sheet, and the like.

The data transfer unit 109 obtains the HDR data, the target information, and the image processing parameter from the print data received from the PC 101, transmits these obtained pieces of information and data to the image processing unit 110 to obtain printer control data, and transmits the obtained printer control data to the printer control unit 112. In this embodiment, the HDR data stored in the storage device 105 of the PC 101 serves as the input image data received by the output apparatus 103. In addition, although the image processing unit 110 is formed in the display apparatus 102 in this embodiment, it may be formed in the PC 101.

Also, the image processing parameter and the printer control data are stored in the storage device 105 of the PC 101 or a storage device (a hard disk, a ROM, or the like) (not shown) of the output apparatus 103. It may be arranged so that these pieces of information will be selected based on the print information included in the print data and be transmitted to the image processing unit 110 and the printer control unit 112. The printer control unit 112 controls the operation of the printing unit 111 in accordance with the printer control data. The printing unit 111 performs printing in accordance with the inkjet printing method. Although the inkjet printing method will be exemplified as the method employed in the printing performed by the printing unit 111 in this embodiment, another printing method such an electrophotography method, or the like, may be employed. The display apparatus 102 includes a display controller 114 that controls image display, and the display controller 114 generates, for example, display data.

Figure 2:
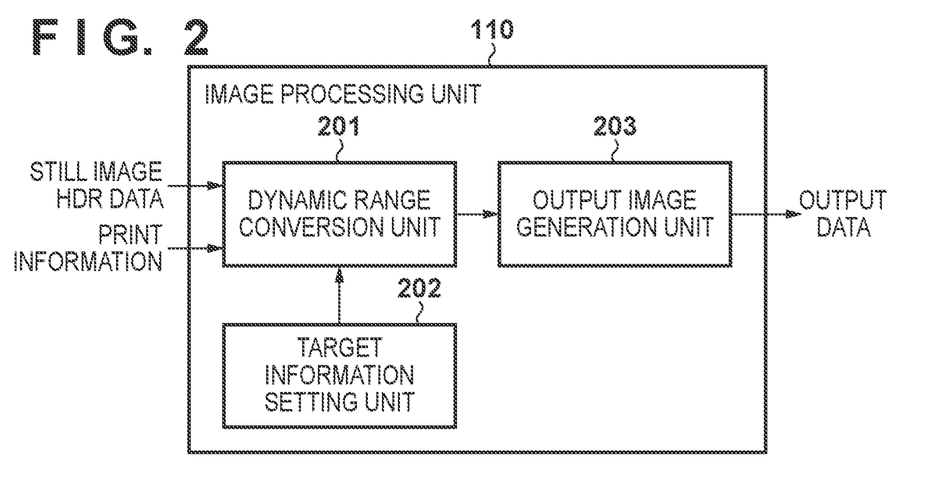
FIG. 2 is a block diagram showing the arrangement of an image processing unit.

FIG. 2 is a block diagram showing the arrangement of the image processing unit 110 according to this embodiment. First, in the image processing unit 110 according to this embodiment, the HDR data and the print information are input to a dynamic range conversion unit 201. A target information setting unit 202 sets the target information and inputs the set target information to the dynamic range conversion unit 201. As will be described later, the dynamic range conversion unit 201 uses each piece of input information to convert the HDR data into image data of a dynamic range that can be input to an output image generation unit 203. The dynamic range of the image data to be input to the output image generation unit 203 is narrower as a luminance range than the high dynamic range of the input HDR data. The dynamic range to be input to the output image generation unit 203 is, for example, a dynamic range that has the maximum luminance 100 cd/m$^2$ of SDR data. Also, a dynamic range whose maximum value is set by the reflection luminance specified by the sheet information set by the user may also be used. In this embodiment, assume that the dynamic range conversion unit 201 converts the dynamic range of the HDR data into the dynamic range of SDR data.

Next, the output image generation unit 203 generates, for the image data (RGB data) output from the dynamic range conversion unit 201, data to be used for printing by the printhead of the printing unit 111.

Figure 3:
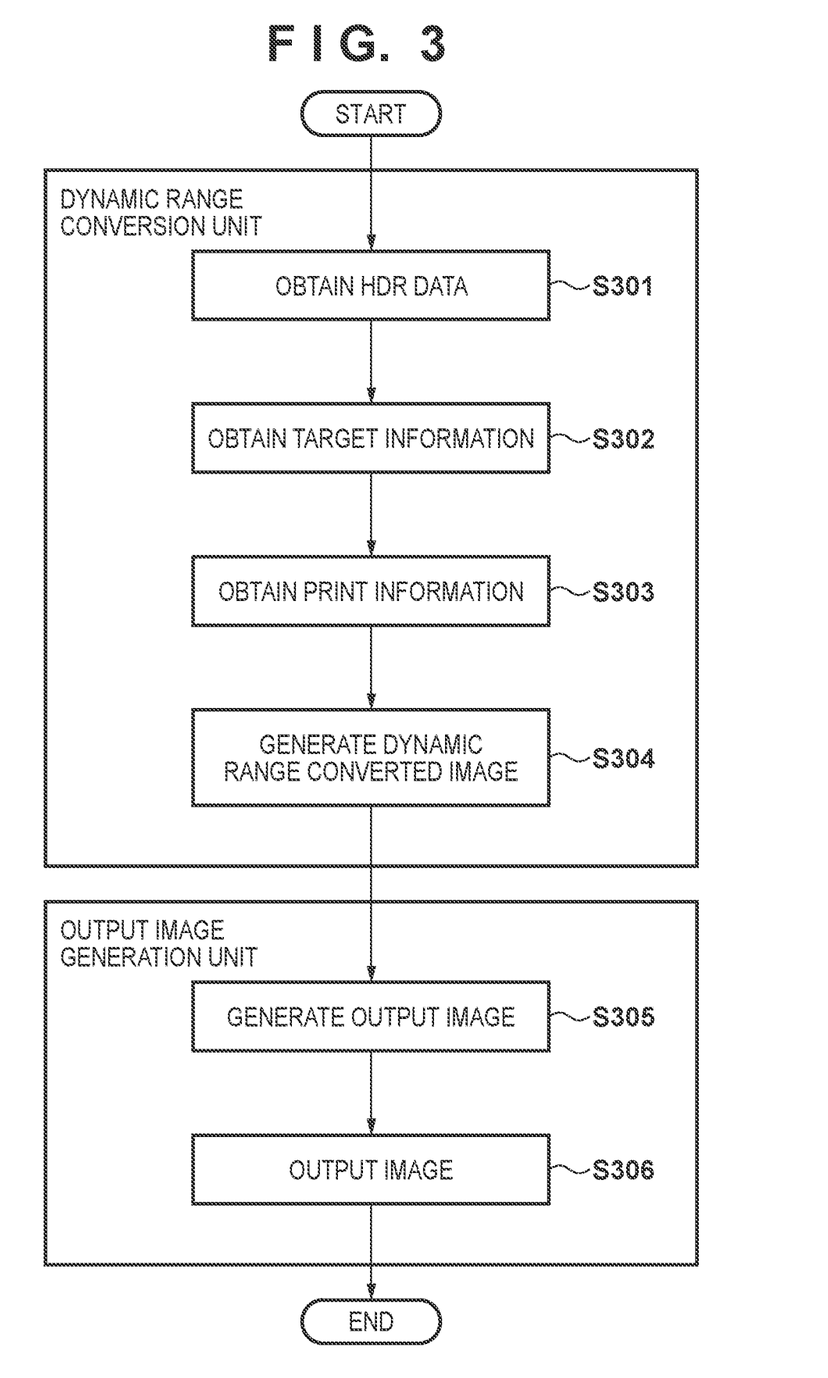
FIG. 3 is flowchart illustrating the procedure of image processing.

FIG. 3 is a flowchart illustrating image processing according to this embodiment. In step S301, the dynamic range conversion unit 201 obtains the RGB data of the HDR data. As described above, Hybrid Log Gamma (HLG) and Perceptual Quantization (PQ) are defined as two image transfer functions of HDR data in, for example, Recommendation ITU-R (International Telecommunication Union Radiocommunication Sector) BT.2100. The HDR data according to this embodiment is stored in accordance with the above-described HLG method that defines the tone based on a relative luminance value. At this stage, the tone is defined for each of R, G, and B elements based on a relative luminance value. Although the HLG method is employed in this embodiment, another method may be employed as long as the tone is defined relatively. In this embodiment, the HDR data obtained in step S301 is also used in the display operation performed by the display apparatus 102, which is an HDR display.

In step S302, the dynamic range conversion unit 201 obtains the target information set by the target information setting unit 202. Target information is information that can convert the input HDR data into data whose tone is defined by an absolute value. In this embodiment, the target information includes luminance dynamic range information and system gamma information. The luminance dynamic range information includes information whose maximum luminance value and minimum luminance value are 1,000 cd/m$^2$ and 0 cd/m$^2$, respectively. The system gamma information includes information in compliance with BT.2100. These pieces of information are input to the dynamic range conversion unit 201. Each piece of target information is held by the image processing unit 110 unless the information is changed. By applying the held values at the time of printing, the reproducibility of the printed product can be ensured even when a plurality of copies of the printed product are to be printed.

In step S303, the dynamic range conversion unit 201 obtains the print information. The print information is information for specifying the dynamic range after the dynamic range conversion. In this embodiment, for example, print mode information is obtained as the print information, and whether an input to the output image generation unit 203 is SDR data of sRGB values will be specified based on the print mode information. As a result, a maximum luminance value of 100 cd/m$^2$ is specified as the luminance dynamic range after the conversion for the SDR data. The print information can be obtained by obtaining information that indicates the sheet type, and suffices to be information that can specify the reflection luminance which is specified from the sheet type. Another piece of information may be used as long as it is information from that the luminance dynamic range information at the time of printing can be obtained. Also, a printed product may be irradiated with illumination of various kinds of illuminance depending on the observation environment. If the printed product is to be irradiated with illumination, the luminance dynamic range of a sheet will expand particularly due to the increase in the brightness of the whiteness of the paper. Hence, the reflection luminance of a sheet when the sheet is irradiated with illumination may be obtained as the luminance dynamic range information at the time of printing.

In step S304, the dynamic range conversion unit 201 generates, based on the target information obtained in step S302 and the print information obtained in step S303, image data obtained by converting the luminance dynamic range from the HDR data. That is, in this embodiment, dynamic range conversion processing is performed to convert a luminance dynamic range that has been obtained from the target information and has the maximum luminance value of 1,000 cd/m$^2$ into a luminance dynamic range that has been obtained from the print information and has the maximum luminance value of 100 cd/m$^2$. As described above, the luminance dynamic range after the dynamic range conversion becomes a luminance dynamic range expressed by the absolute luminance value specified by the print information.

The HDR data according to this embodiment is data converted by a transfer function OETF of the HLG method described above. In addition, the HDR data is also set to be in compliance with BT.2100 by the target information. Hence, the dynamic range conversion unit 201 performs luminance conversion on the HDR data so that a luminance signal level x of the HDR data will be converted into a luminance signal level y by using a transfer function EOTF (an inverse function of OETF) and a transfer function OOTF of the HLG method determined by $$y = OOTF[OETF^{-1}[max0, (1-\beta)E' + \beta)]] \qquad (1)$$

$$E = OETF^{-1}[x] = \begin{cases} \dfrac{x^2}{3} & 0 \leq x \leq 1/2 \\ \dfrac{\{\exp\left(\dfrac{x-c}{a}\right)+b\}}{12} & 1/2 < x \leq 1 \end{cases}$$

$$\beta = \sqrt{3\left(\frac{L_B}{L_W}\right)^{1/\gamma}}$$

$$OOTF[E] = \alpha Y_s^{\gamma-1} E$$

$$\gamma = 1.2 + 0.42\text{Log}_{10}(L_W/1000)$$

where $L_W$ is a maximum luminance value of the display, and $L_B$ is a luminance value of black of the display. In this embodiment, assume that $L_B$ is zero. E' is an HLG method signal, and x is a signal normalized into a range between zero and one. $\alpha$ is a variable for a user gain, $Y_S$ is a normalized luminance value, and E is a linear optical signal normalized into a range between zero and one.

Next, the dynamic range conversion unit 201 sets the data obtained from the OOTF processing as data whose maximum luminance value is 1,000 cd/m², and performs dynamic range conversion processing to convert this data into data whose luminance dynamic range has a maximum luminance value of 100 cd/m² corresponding to the value obtained from the print information. In this embodiment, the dynamic range conversion unit 201 converts the RGB data obtained from the OOTF processing into data which has a luminance value Y and color differences CbCr by $$Y = 0.29900 \times R + 0.58700 \times G + 0.114400 \times B \quad (2)$$

$$Cb = -0.16874 \times R - 0.33126 \times G + 0.50000 \times B \quad (3)$$

$$Cr = 0.50000 \times R - 0.41869 \times G - 0.081 \times B \quad (4)$$

Figure 4A:
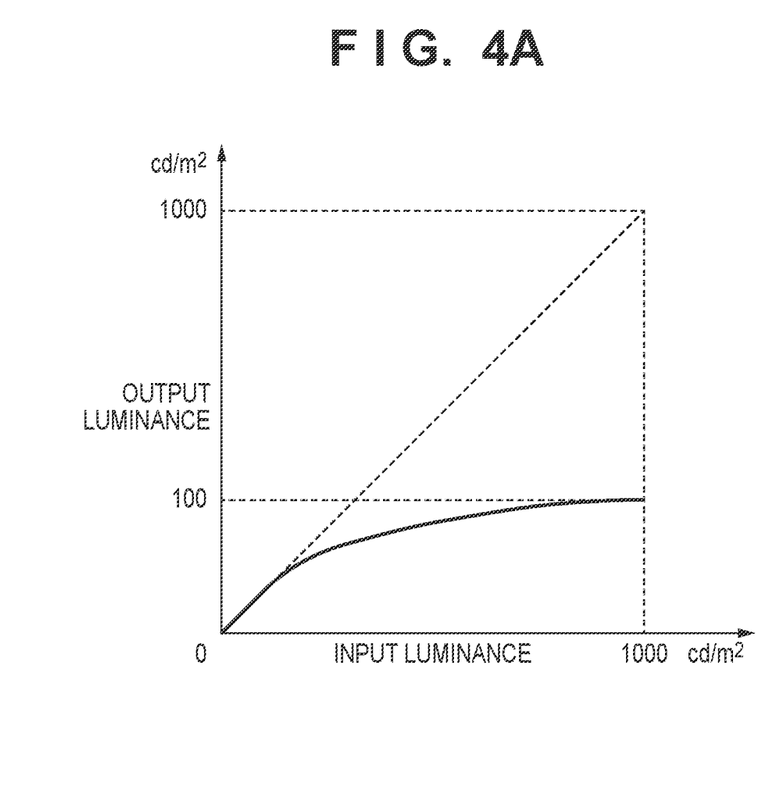
FIGS. 4A and 4B are graphs each showing a conversion curve.
Figure 4B:
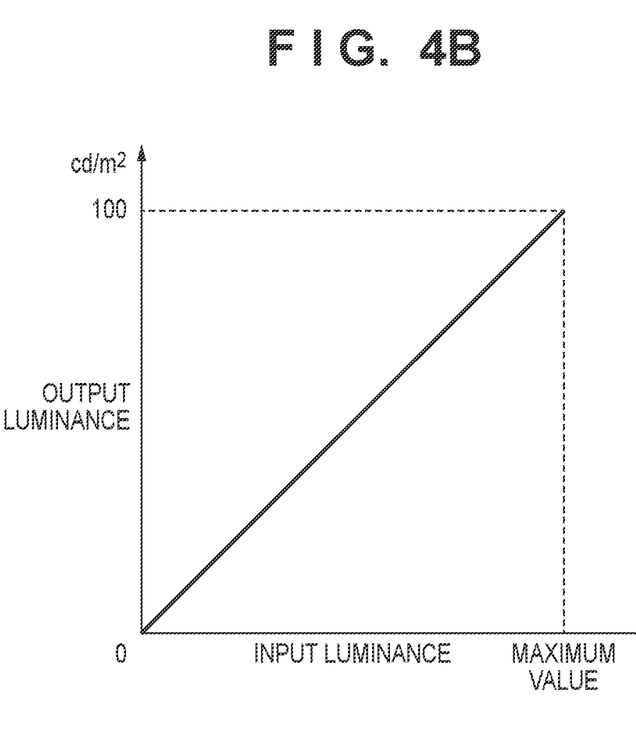

The dynamic range conversion unit 201 performs the luminance dynamic range conversion to convert data of the converted luminance value Y into a luminance value Y' based on a conversion curve indicated by a solid line in a graph (the abscissa indicates an input luminance value and the ordinate indicates an output luminance value) shown in FIG. 4A. A short dashed line shown in FIG. 4A indicates a state in which the input and the output are linear. In this embodiment, as indicated by the solid line shown in FIG. 4A, linear conversion is performed from a dark portion to a specific luminance portion, and conversion by a Log characteristic is performed in a highlight portion. As shown in FIG. 4A, it is preferable to perform dynamic range compression processing to maintain the contrast of the image while reproducing the highlight region of the HDR data. In addition, FIG. 4B shows a case in which the luminance dynamic range of the HDR data is linearly converted relative to the luminance dynamic range of the printing apparatus. In FIG. 4B, since the luminance dynamic range of the HDR data to be input is not defined and undergoes linear conversion relatively, the contrast of the SDR data to be output becomes low. On the other hand, since the luminance dynamic range of the HDR data has been defined based on the target information, the contrast of the SDR data output from the luminance dynamic range conversion shown in FIG. 4A becomes high compared to FIG. 4B. The dynamic range conversion unit 201 combines the converted luminance value Y' and the color difference component to perform conversion into RGB data by $$R = Y + 1.40200 \times Cr \quad (5)$$

$$G = Y - 0.34414 \times Cb - 0.71414 \times Cr \quad (6)$$

$$B = Y + 1.77200 \times Cb \quad (7)$$

Although luminance dynamic range compression has been described above, color gamut compression processing of converting the wide color gamut space of HDR data (for example, ITU-R BT.2020) into the color gamut of SDR data (for example, ITU-R BT.709) may be performed for the color gamut.

Next, in step S305, the output image generation unit 203 generates output image data to be output to the printing unit 111. For example, the output image generation unit 203 performs color conversion processing to convert the SDR data (RGB data), which was output in step S304, into device dependent RGB data. The output image generation unit 203 performs ink color resolution processing to convert the device dependent RGB data into ink color data, and performs tone correction processing to perform tone correction so that the ink color data will be linearly associated with the tone characteristic of the printing apparatus. Furthermore, the output image generation unit 203 performs halftone processing to convert the ink color data into ink dot ON/OFF information, masking data conversion processing that generates binary data to be printed in each print scan of the printhead, and the like.

Next, in step S306, the output image generation unit 203 transmits the generated output image data to the printing unit 111, and an image is subsequently output on a print medium.

According to this embodiment, by setting the target information when HDR data of the HLG method is to be printed, data whose tone is defined by a relative value is converted into data whose tone is defined by an absolute value. Furthermore, data is generated by performing dynamic range conversion, on the data whose tone is defined by an absolute value, by an absolute value up to a luminance dynamic range that is to be used at the time of printing and is determined by the printing information. As a result, a print output with high image quality and high contrast can be obtained.

Although this embodiment showed an example in which a fixed value held by the image processing unit 110 is set as the target information, the target information may be held by obtaining information from the display apparatus 102 at a predetermined timing. In such a case, the information to be obtained will be the luminance dynamic range information and the system gamma information of the display, and information that is in compliance with BT.2100 will be obtained from the display and be held by the image processing unit 110. In addition, since a gamma value y described above may be set by the user on the display, it may be arranged so the gamma value will be obtained from the display. In such a case, the information to be obtained suffices to be information that can convert the input HDR data into the data whose tone is defined by an absolute value.

Although this embodiment described an arrangement in which the target information is held by the image processing unit 110, this embodiment may be arranged so that the target information will be obtained from the HDR data. More specifically, the output apparatus 103 or a print application will generate HDR data obtained by overwriting the target information on a metadata portion (for example, Exif, or the like) of the HDR data at the completion of the printing. This overwritten HDR data will be obtained in step S301, and a result obtained from reading the metadata portion of this HDR data will be obtained as the target information in step S302. Such an arrangement will allow a print output with high image quality and high contrast to be obtained even when printing is performed a plurality of times. In addition, a reproducible print output can be obtained because the target information will not change even when printing is performed a plurality of times.

Figure 5A:
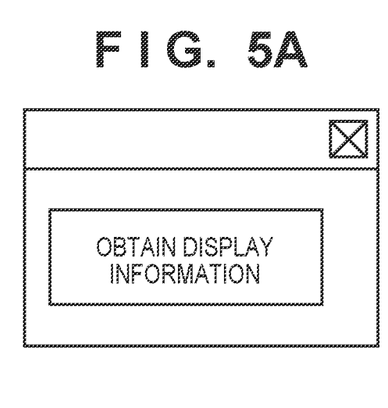
FIGS. 5A, 5B, and 5C are views each showing a user interface screen.
Figure 5B:
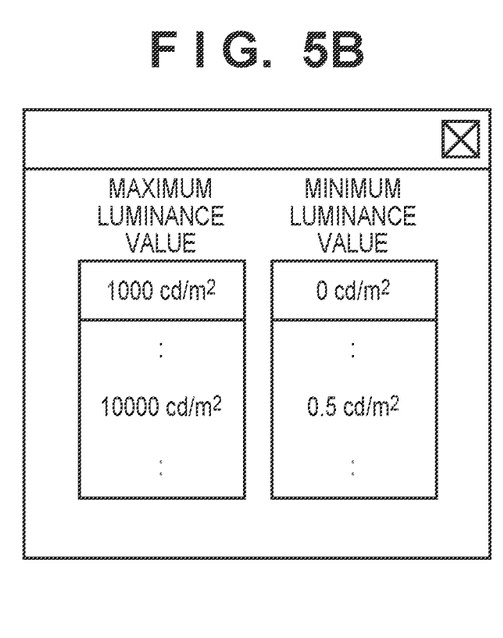
Figure 5C:
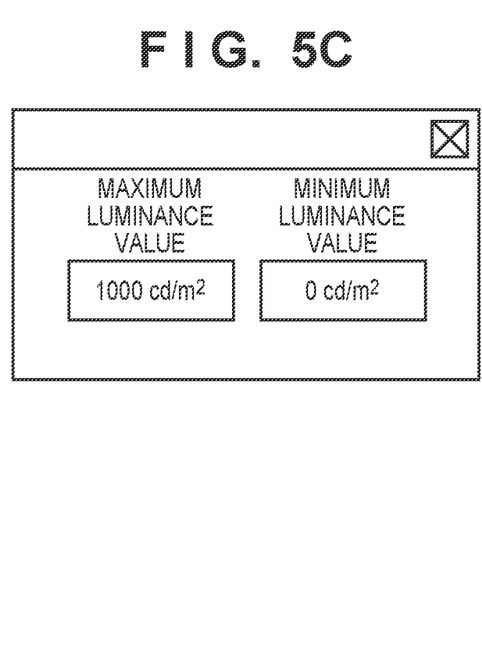

In addition, it may be arranged so that the target information will be accepted from the user via user interfaces as shown in FIGS. 5A to 5C. As shown in FIGS. 5A to 5C, when the user presses "obtain display information", the target information is obtained from the display apparatus 102 as described above. The HDR data is displayed in a display. The dynamic range conversion unit 201 obtains the display information recording the display state of the display apparatus 102 at that time from the display apparatus 102 or via the PC 101 at the point of time at which the user who is to perform printing on the output apparatus 103 has pressed a print button on a print application or on a panel of the output apparatus 103. Also, in a case in which the display information is stored in the PC 101 at a suitable time in synchronization with the display, the dynamic range conversion unit 201 may obtain the display information from the PC 101. Also, it may be arranged so that the display information will be obtained at the point of time in which the print application or the output apparatus 103 has been activated or be reobtained at the timing at which the display setting has been changed on the side of the display apparatus 102. That is, it is sufficient as long as the display state of the display (the display apparatus 102) viewed by the user at the time of printing can be obtained. In addition, although a single display is connected to the PC 101 in this embodiment, a plurality of displays may be simultaneously connected to a single PC and used in some cases. In a case in which extended display is performed by a plurality of displays (display performed across a plurality of displays), the display that is displaying the print preview of HDR data will be recognized and the display information of this play will be obtained. In addition, in a case in which duplicate display is being performed among the plurality of displays (the same display is performed among the plurality of displays), the user may select the display from which the display information is to be obtained or a display from which the display information will be preferably obtained may be set in advance. Furthermore, the target information may be obtained by arranging so that the user will select the target information from a pull-down menu or input the target information as shown in FIGS. 5B and 5C, respectively. As a result, the target information can be selected arbitrarily by the user. Note that the screens shown in FIGS. 5A to 5C may be arranged so that they will be formed on, for example, the output apparatus 103 or the PC 101.

Second Embodiment

Points different from the first embodiment will be described in the second embodiment hereinafter. In this embodiment, the target information will be set based on information of a plurality of display apparatuses 102.

This embodiment will describe an example in which the display information of a plurality of display apparatus 102 is used to set the target information in the process of step S302 of FIG. 3. In this embodiment, three display apparatuses 102, such as a PC, a smartphone, a tablet, and the like, which are connected to corresponding displays, are connected to a network by a LAN cable, a communication network, and the like. In this embodiment, in step S302, a dynamic range conversion unit 201 will obtain a maximum luminance value and a minimum luminance value that are the luminance information of the luminance dynamic range information of each of the three display apparatuses 102. The dynamic range conversion unit 201 may obtain the pieces of display information of the plurality of display apparatuses 102 by accepting user input on a UI as shown in FIG. 5C. Also, the dynamic range conversion unit 201 may obtain the display information of the display apparatus 102 from the management software of each of the PC, the smartphone, and the tablet that is connected to a corresponding display, and this information may be automatically obtained via the network. In such a case, the display information obtainment timing may be, for example, the point of time at which the user who is to perform printing on a output apparatus 103 has pressed a print button on a print application or on a panel of the output apparatus 103, and the display information recording the display state at this point of time is obtained from the display apparatus 102 or via a PC 101. In addition, it may be arranged so that the display information will be obtained via the network at appropriate times and the pieces of display information of the plurality of the display apparatuses 102 will be used at the point of time in which the print button is pressed. Also, although the plurality of display apparatuses 102 are connected to different apparatuses such as a PC, a smartphone, a tablet, and the like, in this embodiment, the apparatus 102 may be arranged so that the plurality of display apparatuses 102 are connected to one PC 101 as described above. Furthermore, it may be arranged so that a plurality of PCs 101, which are connected to the plurality of display apparatuses 102, will be present on a network.

For example, a maximum luminance value of 2,000 $cd/m^2$, a maximum luminance value of 1,500 $cd/m^2$, and a maximum luminance value of 1,000 $cd/m^2$ are the pieces of display information obtained for a display A, a display B, and a display C, respectively, in this embodiment. In addition, all of the three displays have a minimum luminance value of 0 $cd/m^2$. In this embodiment, for example, the maximum luminance value of 1,000 $cd/m^2$ and the minimum luminance value of 0 $cd/m^2$ of the display C which has the narrowest luminance dynamic range among the three display apparatuses are set as the target information.

According to this embodiment, the luminance dynamic range information of a display apparatus with the narrowest luminance dynamic range among the plurality of display apparatuses 102 is set as the target information. As a result, a print output for data that can be displayed in any of the displays can be obtained in addition to obtaining a high image quality print output with a high contrast.

Alternatively, the luminance dynamic range information of the display apparatus 102 with the widest luminance dynamic range among the plurality of display apparatuses 102 may be set as the target information. As a result, a print output corresponding to a display apparatus that displays an image with the highest contrast can be obtained.

Alternatively, an average of the luminance dynamic ranges of the plurality of display apparatuses 102 may be set as the target information. For example, a maximum luminance value of 1,500 $cd/m^2$ and a minimum luminance value of 0 $cd/m^2$ can be set as the luminance dynamic range information. As a result, a balanced print output can be obtained. Furthermore, a statistical value other than the average may be used.

In this embodiment, the target information was set in accordance with the widths of the luminance dynamic ranges of the plurality of display apparatuses 102. However, in a case in which the maximum luminance values vary more than the minimum luminance values of the plurality of display apparatuses 102, the widths of the luminance dynamic ranges may be determined based only on the maximum luminance values.

Third Embodiment

Points different from those of the first embodiment and the second embodiment will be described in the third embodiment hereafter. This embodiment will describe an arrangement for changing between the processing according to the first embodiment and the processing performed when HDR data of the PQ method is input.

Figure 6:
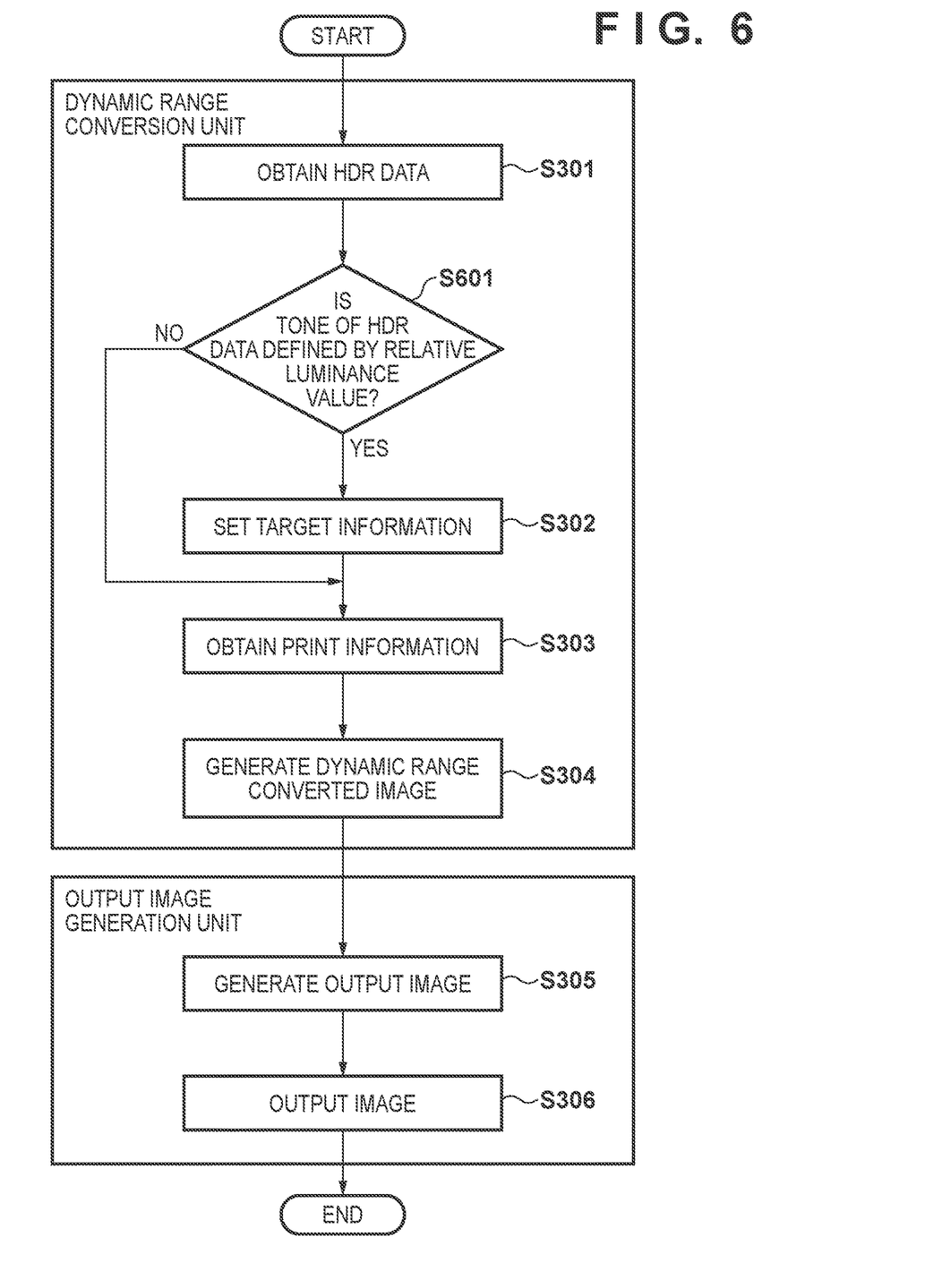
FIG. 6 is a flowchart illustrating the procedure of image processing.

In this embodiment, HDR data (RGB data) obtained in step S301 of FIG. 6 is recorded in accordance with the PQ method that defines the tone in an absolute luminance value described above. In this embodiment, assume that information up to 10,000 cd/m² has been recorded in the HDR data.

Since the tone is defined by an absolute luminance value in the PQ method, the luminance dynamic range is determined by the HDR data itself. Hence, if it is determined in the process of step S601 after the process of step S301 that the HDR data whose tone is defined by an absolute luminance value as in the PQ method has been obtained, the process of step S302 is skipped.

The description of the process of step S303 is similar to that of the process of step S303 of FIG. 3.

In step S304, a dynamic range conversion unit 201 generates, based on the print information obtained in step S303, data in which the luminance dynamic range has been converted from the luminance dynamic range of the HDR data. In a case in which HDR data of the PQ method is obtained, the dynamic range conversion unit 201 converts the information of a luminance dynamic range of the HDR data that has a maximum luminance value of 10,000 cd/m² into a luminance dynamic range which has a maximum luminance value of 100 cd/m² and has been obtained from the print information obtained in step S303. The HDR data undergoes luminance conversion so that a luminance signal level x of the HDR data will be converted into a luminance signal level y by using a transfer function EOTF of the PQ method defined by $$y = EOTF[E'] = 10000Y \quad (8)$$

$$Y = \left( \frac{\max\left[\left(E'^{1/m2}\right) - C_1\right), 0\right]}{C_2 - C_3 E'^{1/m2}} \right)$$

In this embodiment, $L_B$ is 0. E' is a PQ method signal, and x is a signal normalized into a range between 0 and 1.

Figure 7:
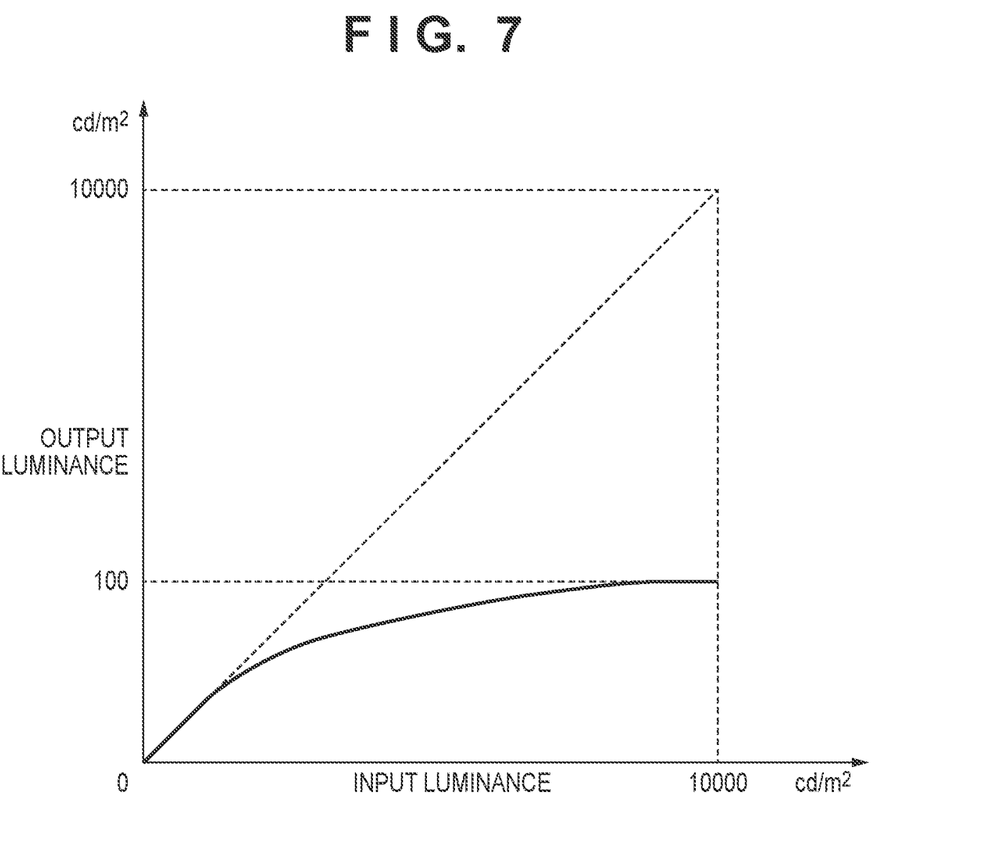
FIG. 7 is a graph showing a conversion curve.

Next, the dynamic range conversion unit 201 sets the data converted by the EOTF processing as data whose maximum luminance value is 10,000 cd/m², and performs dynamic range conversion processing to convert this data into data whose luminance dynamic range has a maximum luminance value of 100 cd/m². In this embodiment, the converted SDR data is obtained by performing conversion on the data of a converted luminance value Y by the conversion curve shown in FIG. 7.

The processes of steps S305 and S306 are similar to the processes of steps S305 and S306 of FIG. 3 according to the first embodiment.

According to this embodiment, the processing can be switched in accordance with whether the HDR data of the HLG method or the HDR data of the PQ method is to be used, and a suitable print output corresponding to the transfer function of the HDR data can be obtained.

Although the luminance dynamic range conversion has been performed by using YCbCr in this embodiment, the luminance dynamic range conversion may also be performed by using ICtCp. ICtCp is a color space that has a high dynamic range so as to target a wide color gamut signal. I represents a luminance component and CtCp represents color difference components. The luminance component I is information that takes human vision characteristics in a wide luminance range into consideration. As a result, using the ICtCp color spaces allows luminance dynamic range conversion to be performed by taking the human vision characteristics into consideration.

Figure 8:
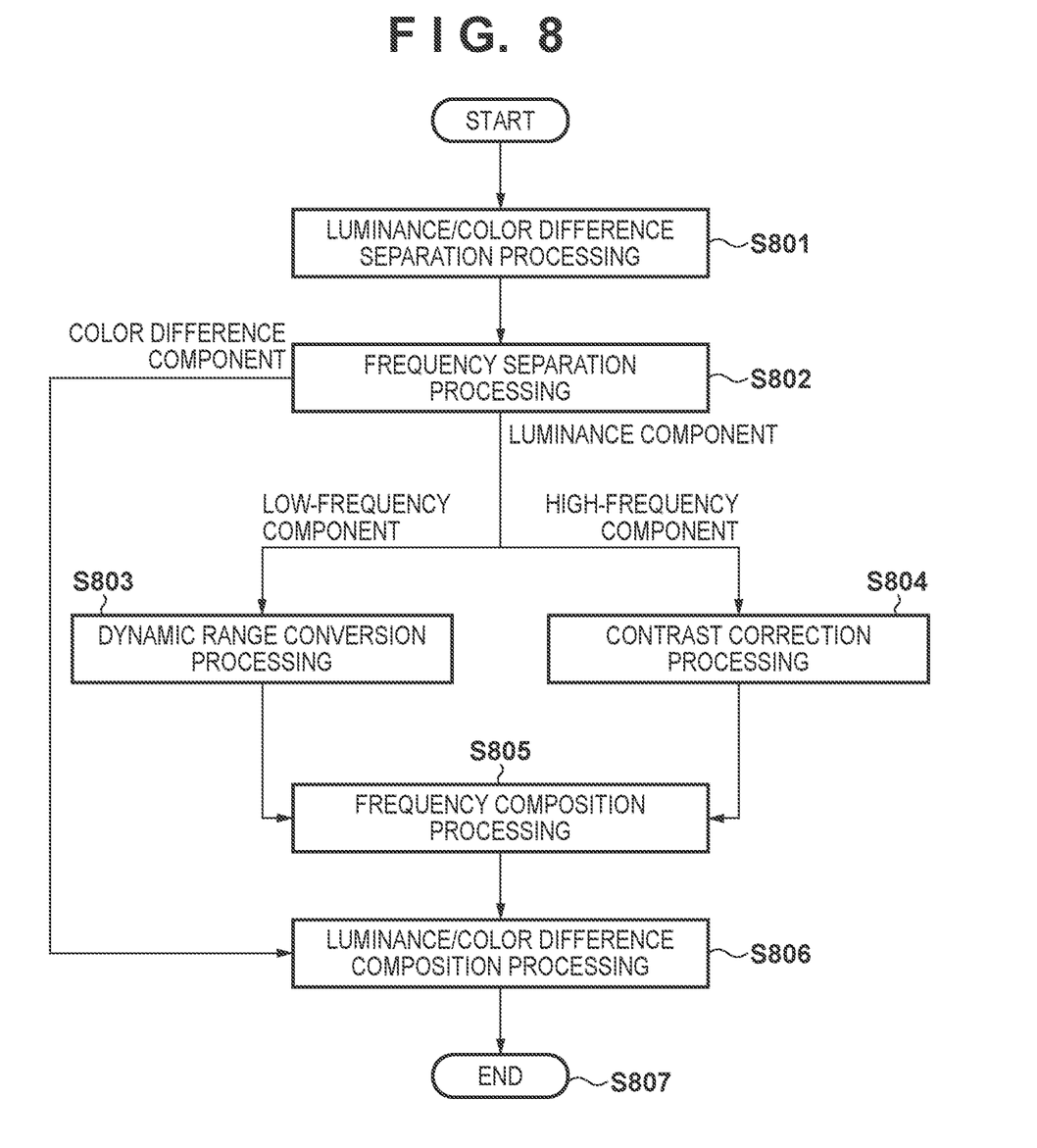
FIG. 8 is a flowchart illustrating processing using dynamic range conversion processing.
Figure 9:
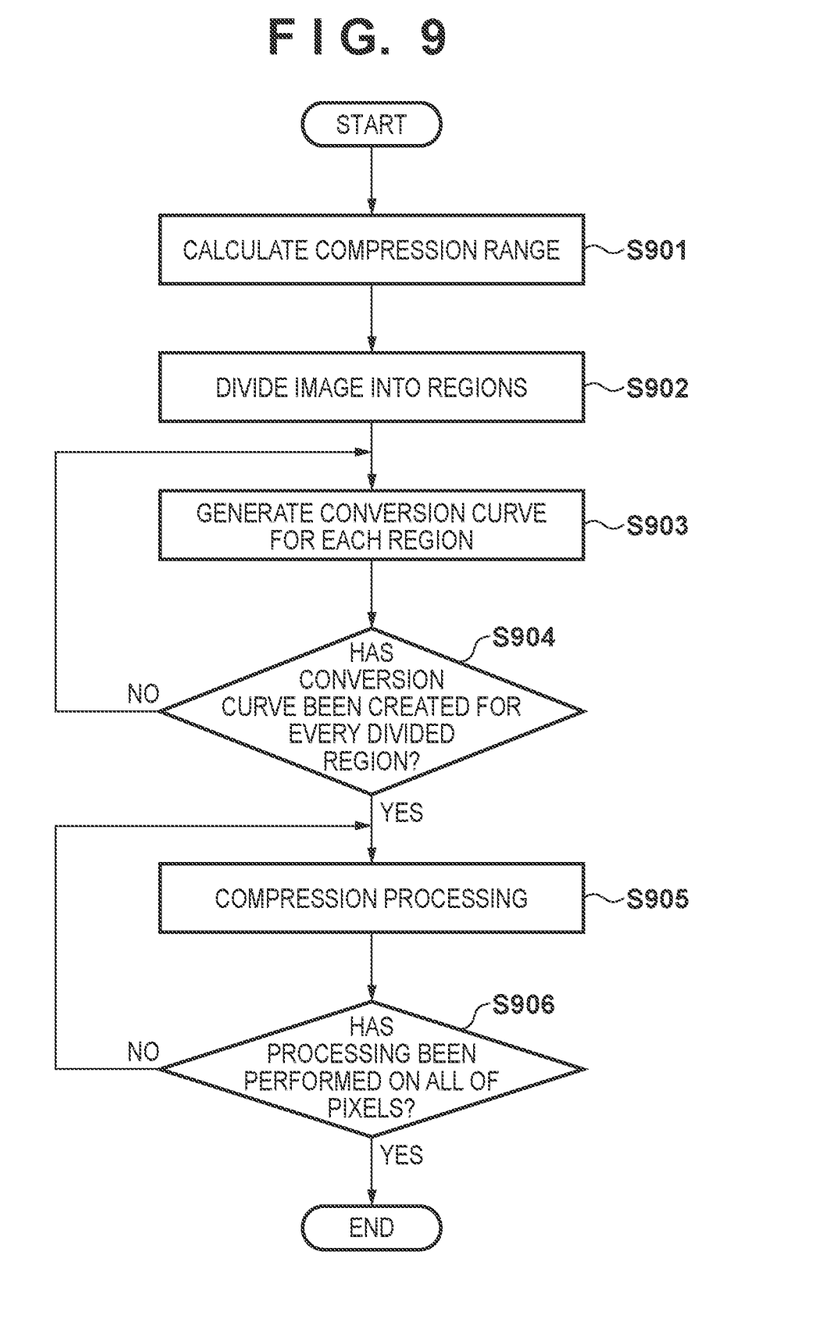
FIG. 9 is a flowchart illustrating the procedure of the dynamic range conversion processing.

Also, in this embodiment, instead of performing luminance dynamic range conversion based on the characteristics shown in FIGS. 4A and 4B, the dynamic range conversion processing may be performed in accordance with the processing shown in the flowcharts of FIGS. 8 and 9.

In step S801 of FIG. 8, the dynamic range conversion unit 201 separates the RGB data obtained from the OOTF processing by equations (2), (3), and (4) into a luminance component and color difference components.

In step S802, the dynamic range conversion unit 201 performs processing to separate a low-frequency component and a high-frequency component of the data converted into the luminance component. This is because processing is changed between the low-frequency components and the high-frequency components based on the Retinex theory. The Retinex theory is a theory that models how the human brain perceives light and color. According to this theory, the intensity of light that enters the eye can be represented by a product of the reflectance of an object and illumination light illuminating the object, and the brightness and the color felt by a person depends more on the relative amount of change from the surroundings than an absolute optical amount. Here, the absolute optical amount is the illumination light illuminating the object, and the relative amount of change is the reflectance of the object.

In step S802, the dynamic range conversion unit 201 extracts the low-frequency component of the image data as an illumination light component illuminating the object. A low pass filter is applied to create the low-frequency component. As the processing method, a spatial filter may be applied or a target frequency component may be temporarily converted into a spatial frequency by FFT and turned back into the frequency component by IFFT after undergoing filter processing. The frequency to be the target may be determined, in consideration of the human vision characteristics, based on the sheet size of the sheet on which the printed product is to be observed or an observation distance. In order to obtain the high-frequency component, a high pass filter that is the opposite of the low pass filter may be applied or the obtained low-frequency component may be subtracted from the original image.

In step S803, the dynamic range conversion unit 201 performs dynamic range conversion processing on the low-frequency component based on the input luminance dynamic range information and the output luminance dynamic range information. The processing of step S803 will be described in detail later with reference to FIG. 9.

In step S804, the dynamic range conversion unit 201 performs contrast correction processing on the high-frequency component. The contrast correction processing is processing in which an obtained image is multiplied by a coefficient k. In a case in which the printed product is to be faithfully brought close to the input data, k=approximately one. In a case in which degradation such as ink bleeding on the printed product is to be further considered, a value equal to one or more is set as the coefficient k.

In step S805, the dynamic range conversion unit 201 combines the image data in which the dynamic range conversion has been performed on the low-frequency component and the image data in which contrast correction has been performed on the high-frequency component. As a result, the image data is compressed into a predetermined dynamic range, and a luminance image with a corrected contrast is obtained.

In step S806, the dynamic range conversion unit 201 combines the luminance component and the color difference component to perform conversion into RGB data by equations (5), (6), and (7). After the process of step S806, the processing of FIG. 8 ends.

The dynamic range conversion processing of step S803 will be described by using the flowchart of FIG. 9.

In step S901, the dynamic range conversion unit 201 calculates a compression range. In this embodiment, dynamic range conversion processing is performed to convert the luminance dynamic range that has been obtained from the target information and has a maximum luminance value of 1,000 cd/m$^2$ into the luminance dynamic range that has been obtained from the print information and has a maximum luminance value of 100 cd/m$^2$. In addition, the dynamic range conversion unit 201 obtains an exposure luminance value Ya from the metadata of HDR data. This is the point where the user has set the exposure during an image capturing operation. Assume that the exposure luminance value Ya is 18 cd/m$^2$ in this embodiment.

In step S902, the dynamic range conversion unit 201 divides the image of the HDR data into regions. The region division of the image may be performed by dividing the image into predetermined rectangular size regions or by creating groups of similar luminance pixels based on the luminance image information. In the latter case, it is possible to restore the contrast of a specific luminance range that has undergone region division, and an image with better contrast can be obtained. In addition, it is possible to use not only the luminance data, but also the RGB data. As a result, image recognition can be performed by the RGB data, and a method that restores the contrast in accordance with each type of recognized region can be employed.

Figure 10A:
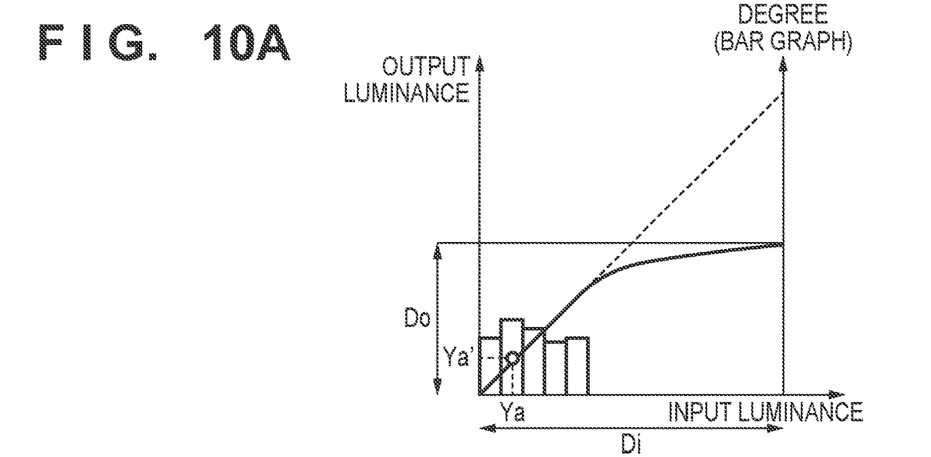
FIGS. 10A, 10B, and 10C are graphs each showing a conversion curve.
Figure 10B:
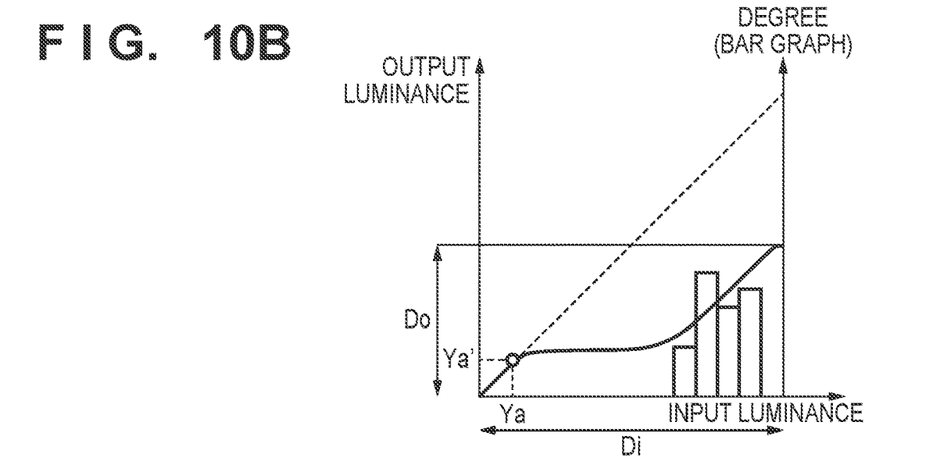
Figure 10C:
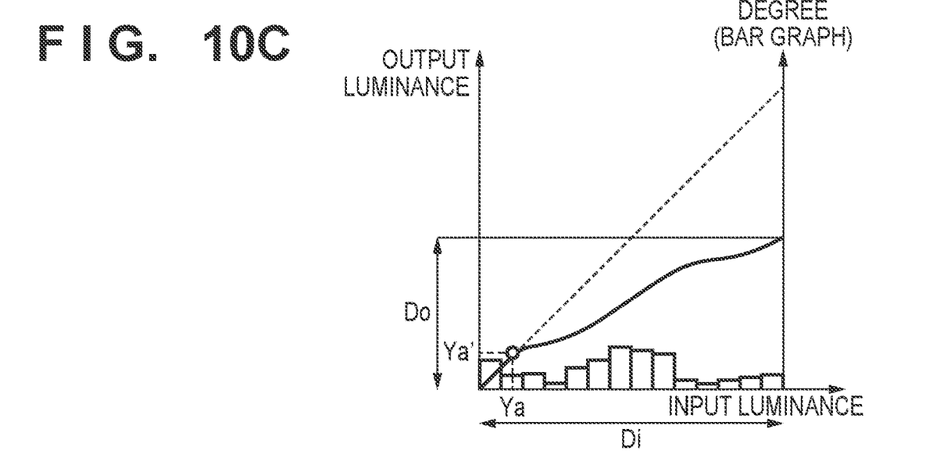

In step S903, the dynamic range conversion unit 201 creates a conversion curve for each region divided in step S902. FIGS. 10A, 10B, and 10C are graphs each showing an example of a conversion curve. FIG. 10A is a graph representing the conversion curve of a given region. The abscissa indicates an input luminance value, the ordinate indicates an output luminance value, and the thick line indicates the conversion curve. The bar graph shows the luminance distribution of the region, and the bars correspond to the degrees of a predetermined luminance range (corresponding to the ordinate on the right). In FIGS. 10A, 10B, and 10C, Di denotes a pre-conversion luminance dynamic range and Do denotes a post-conversion luminance dynamic range. In a case in which the slope is one, that is, 45°, the input luminance value and the output luminance value will match, and image change will not occur in this portion. That is, the pre-conversion contrast of the dynamic range will be maintained. As the slope decreases (to an angle less than 45°), the post-conversion contrast degrades compared to the pre-conversion contrast. The contrast needs to be maintained to obtain a suitable post-conversion image, and it is preferable to set the slope to one. Since a low-frequency component is being handled in this case, conversion needs to be performed, as much as possible, to set the slope to one to maintain the contrast of the low-frequency component. FIG. 10B represents the conversion curve of another region, but the luminance distribution is skewed toward the high-luminance side. In a similar manner to FIG. 10A, a slope close to one is assigned to a high-degree luminance group in accordance with the degrees of the distribution. FIG. 10C represents a conversion curve of a region in which the luminance is distributed uniformly. In this case, the slope cannot be assigned to one even if a high-degree luminance group is present. This is because assigning a slope of one to a specific luminance group will cause the slope of another luminance group to be set closer to zero due to the narrowness of the post-conversion luminance dynamic range Do. In such a case, the slope will be assigned on average among the luminance groups, and the slope will be distributed in correspondence with each degree so no luminance group, among the luminance groups, will have a slope which is set extremely close to zero. In addition, FIGS. 10A to 10C representing different regions of the image have a common portion. This common portion is, for example, the exposure luminance value Ya obtained in step S901, and each conversion curve is created so that the luminance value after the conversion will constantly be a predetermined value Ya'. As a result, the exposure luminance set by the user at the time of image capturing can be maintained while reproducing the tone on the high-luminance side.

In step S904, the dynamic range conversion unit 201 determines whether a conversion curve has been created for every divided region. If it is determined that the conversion curve has not been created for every divided region, the processing is repeated from step S903. Otherwise, the process advances to step S905.

In step S905, the dynamic range conversion unit 201 uses each created conversion curve to perform dynamic range compression procession on each pixel. At this time, the processing is performed in consideration of the information of the surrounding regions so as not to create locations where the tone becomes discontinuous between regions. More specifically, a window of the same degree as the region can be assigned so that weighting can be performed based on the area included in the window and the dynamic range compression processing can be performed based on this ratio. Also, since a simple area ratio can cause an image defect such as a halo to be generated on the boundary, the weight may be changed based on the average luminance value of the target region. That is, an image defect can be suppressed by reducing the weight compared to the target pixel in accordance with the increase in the variation of the average luminance values of the respective surrounding regions.

In step S906, the dynamic range conversion unit 201 determines whether the processing of step S905 has been performed on all of the pixels. If it is determined that the processing has not been performed on all of the pixels, the processing is repeated from step S905. Otherwise, the processing of FIG. 9 ends.

In this manner, by separating the image data into a high-frequency component and a low-frequency component based on the Retinex theory and performing luminance dynamic range conversion on the low-frequency component by using a conversion curve for each region of the image, a high-contrast image that considers the human vision characteristic can be generated.

The embodiments showed an example in which HDR data in compliance with the BT.2100 standard is to be printed. However, the present invention is not limited to the BT.2100 standard. Processing that is in compliance with another standard may be performed or only the transfer by OETF and EOTF may be performed. For example, although the HLG method and the PQ method have been exemplified as the transfer functions, another method may be used as long as a transfer function that processes the HDR data by defining the tone by the relative luminance value or the absolute luminance value is used. In such a case, the transfer functions and system gamma represented by equations (1) and (8) will be of a form that complies with the corresponding standard. Alternatively, only the transfer functions (OETF and EOTF) may be applied without complying with a standard.

Although FIGS. 4A and 4B, 7, and 8 were exemplified as luminance dynamic range conversion processing methods according to the embodiments, the present invention is not limited to these methods. Any kind of method can be used as long as it is a method that performs conversion of the luminance dynamic range. In addition, the input/output luminance dynamic ranges of the dynamic range conversion processing are not limited to the luminance dynamic ranges (1,000 cd/m$^2$ and the like) exemplified in each embodiment. Furthermore, a display apparatus 102 according to the embodiments may be an apparatus of any form, and is not limited to the display as long as it is an apparatus that can display information such as a panel or a touch panel attached to a smartphone or an apparatus.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor having a memory storing instructions, that when executed by the processor, cause the processor at least:
  to obtain high-dynamic range (HDR) data that represents a high-dynamic range (HDR) image, wherein a tone of each pixel of the HDR image is defined based on a relative luminance value that has no units and whose physical quantity is not identifiable by the relative luminance value alone, and a dynamic range of luminance of the HDR data is not defined based on an absolute luminance value that has a unit and whose physical quantity is identifiable by the unit alone;
  to obtain print information to perform printing based on the obtained HDR data;
  to set luminance information for defining the dynamic range of luminance of the HDR data based on the absolute luminance value by converting the relative luminance value of the obtained HDR data into the absolute luminance value;
  to perform, based on the set luminance information, a first conversion for defining the dynamic range of luminance of the HDR data by converting the relative luminance value of the obtained HDR data into the absolute luminance value; and
  to perform a second conversion for converting a dynamic range of luminance of the HDR data, on which the first conversion has been performed, into a dynamic range corresponding to printing of an image on a print medium to be performed as specified by the obtained print information.

2. The apparatus according to claim 1, wherein the print information is information for specifying a dynamic range to be obtained by the second conversion.

3. The apparatus according to claim 2, wherein the print information includes information that indicates a type of a sheet to be printed.

4. The apparatus according to claim 1, wherein the obtained HDR data is data after optoelectronic conversion on an image capturing side.

5. The apparatus according to claim 1, wherein the at least one processor is further caused to display the luminance information of a display apparatus, wherein the luminance information of the display apparatus is set.

6. The apparatus according to claim 5, wherein, in a case in which the luminance information of a plurality of display apparatuses is obtained, the luminance information corresponding to the plurality of display apparatuses is set.

7. The apparatus according to claim 1, wherein the at least one processor is further caused to hold the absolute luminance value.

8. The apparatus according to claim 1, wherein the at least one processor is further caused to perform the second conversion by using conversion information for converting a dynamic range.

9. The apparatus according to claim 1, wherein the at least one processor is further caused to convert the dynamic range of the luminance of the HDR data on which the first conversion has been performed, into a dynamic range, corresponding to printing to be performed, so that input luminance and output luminance will match within a predetermined luminance range by performing a linear conversion from a dark portion to a specific luminance portion, and performing a conversion by a logarithmic characteristic in a highlight portion.

10. The apparatus according to claim 1, wherein the at least one processor is further caused to divide an image represented by the HDR data into regions, and
   wherein the second conversion is performed by using conversion information that is used to convert a dynamic range and is set for each divided region.

11. The apparatus according to claim 10, wherein region division is performed on a low-frequency component of the image represented by the HDR data.

12. The apparatus according to claim 11, wherein the at least one processor is further caused to perform contrast correction on a high-frequency component of the image represented by the HDR data.

13. The apparatus according to claim 1, wherein the at least one processor is further caused to perform printing based on data that has undergone the second conversion.

14. The apparatus according to claim 1, wherein the HDR data is data defined by a Hybrid Log Gamma (HLG) method.

15. The apparatus according to claim 1, wherein the at least one processor is further caused:
   to obtain luminance dynamic range information of each of a plurality of display apparatuses; and
   to set the luminance dynamic range information of a display apparatus with the narrowest luminance dynamic range among the plurality of display apparatuses as the luminance information for defining the dynamic range of luminance of the HDR data based on the absolute luminance value by converting the relative luminance value of the obtained HDR data into the absolute luminance value.

16. The apparatus according to claim 15, wherein the at least one processor is further caused to obtain a maximum luminance value and a minimum luminance value that are luminance dynamic range information of each of a plurality of display apparatuses.

17. The apparatus according to claim 1, wherein the at least one processor is further caused to obtain the luminance information for defining the dynamic range of luminance of the HDR data from a metadata portion of the HDR data.

18. The apparatus according to claim 17, wherein the luminance information for defining the dynamic range of luminance of the HDR data is overwritten on the metadata portion of the HDR data after printing.

19. The apparatus according to claim 1, wherein the at least one processor is further caused to perform, based on the set luminance information, the first conversion by using a transfer function.

20. The apparatus according to claim 19, wherein the at least one processor is further caused to perform, based on the set luminance information, the first conversion by using an electro-optical transfer function and an opto-optical transfer function.

21. An image processing method to be executed in an image processing apparatus, the method comprising:
   obtaining high-dynamic range (HDR) data that represents a high-dynamic range (HDR) image, wherein a tone of each pixel of the HDR image is defined based on a relative luminance value that has no units and whose physical quantity is not identifiable by the relative luminance value alone, and a dynamic range of luminance of the HDR data is not defined based on an absolute luminance value that has a unit and whose physical quantity is identifiable by the unit alone;
   obtaining print information to perform printing based on the obtained HDR data;
   setting luminance information for defining the dynamic range of luminance of the HDR data based on the absolute luminance value by converting the relative luminance value of the obtained HDR data into the absolute luminance value;
   performing, based on the set luminance information, a first conversion for defining the dynamic range of luminance of the HDR data by converting the relative luminance value of the obtained HDR data into the absolute luminance value; and
   performing a second conversion for converting a dynamic range of luminance of the HDR data, on which the first conversion has been performed, into a dynamic range corresponding to printing of an image on a print medium to be performed as specified by the obtained print information.

22. The method according to claim 21, wherein the HDR data is data defined by a Hybrid Log Gamma (HLG) method.

23. A non-transitory computer-readable storage medium storing a program to cause a computer to function:
   to obtain high-dynamic range (HDR) data that represents a high-dynamic range (HDR) image, wherein a tone of each pixel of the HDR image is defined based on a relative luminance value that has no units and whose physical quantity is not identifiable by the relative luminance value alone, and a dynamic range of luminance of the HDR data is not defined based on an absolute luminance value that has a unit and whose physical quantity is identifiable by the unit alone;
   to obtain print information to perform printing based on the obtained HDR data;
   to set luminance information for defining the dynamic range of luminance of the HDR data based on the absolute luminance value by converting the relative luminance value of the obtained HDR data into the absolute luminance value;
   to perform, based on the set luminance information, a first conversion for defining the dynamic range of luminance of the HDR data by converting the relative luminance value of the obtained HDR data into the absolute luminance value; and
   to perform a second conversion for converting a dynamic range of luminance of the HDR data, on which the first conversion has been performed, into a dynamic range corresponding to printing of an image on a print medium to be performed as specified by the obtained print information.

24. The medium according to claim 23, wherein the HDR data is data defined by a Hybrid Log Gamma (HLG) method.

* * * * *